United States Patent [19]

Gusev et al.

[11] 4,141,077
[45] Feb. 20, 1979

[54] METHOD FOR DIVIDING TWO NUMBERS AND DEVICE FOR EFFECTING SAME

[76] Inventors: Valery F. Gusev, ulitsa Karbysheva 13-a, kv. 35; Gennady N. Ivanov, ulitsa Dekabristov 184-a, kv. 22, both of Kazan; Vladimir Y. Kontarev, ploschad Junosti, 4, kv. 3, Moscow; Genrikh I. Krengel, ulitsa Ibragimova, 45, kv. 49; Gleb M. Persov, ulitsa Svetlaya, 28, kv. 30, both of Kazan; Vyacheslav Y. Kremlev, Berezovaya alleya, korpus 423, kv. 81, Moscow; Mansur Z. Shagivaleev, ulitsa Karbysheva, 17, kv. 75, Kazan; Jury I. Schetinin, 103536, korpus 503, kv. 106, Moscow; Azat U. Yarmukhametov, ulitsa Adelya Kutuya, 12, kv. 23, Kazan, all of U.S.S.R.

[21] Appl. No.: 811,843

[22] Filed: Jun. 30, 1977

[30] Foreign Application Priority Data

Jul. 7, 1976 [SU] U.S.S.R. .............................. 2379670[I]

[51] Int. Cl.$^2$ ............................................... G06F 7/52
[52] U.S. Cl. .................................................... 364/767
[58] Field of Search ................................. 364/766, 767

[56] References Cited

U.S. PATENT DOCUMENTS

| | | | |
|---|---|---|---|
| 3,293,418 | 12/1966 | Thornton ............................. | 364/767 |
| 3,733,477 | 5/1973 | Tate et al. ........................... | 364/767 |
| 3,852,581 | 12/1974 | Reynard et al. ..................... | 364/767 |

*Primary Examiner*—Jerry Smith
*Attorney, Agent, or Firm*—Lackenbach, Lilling & Siegel

[57] ABSTRACT

Disclosure is made of a method for dividing two numbers, whereby the numbers are converted to the binary code, and there is formed an address code of three digits of the dividend (the or remainder) by determining the position of the highest-order significant digit in the three high-order digits of the divisor. The address thus formed serves to produce three digits of the remainder, i.e. a digit corresponding to the highest-order significant digit of the divisor code and two adjacent higher-order digits. The three digits of the remainder are analyzed and, depending upon the result of the analysis, the code of either the single, or doubled, or trebled divisor is subtracted from the remainder code, whereby the next two quotient code digits are produced.

Disclosure is further made of a device for effecting the proposed method for dividing two numbers, which comprises an arithmetic unit connected to dividend (or remainder) registers, buffer registers, divisor registers and quotient registers. The device further includes a converter of the code of the three high-order divisor digits to the address code of the three remainder digits, whose information input is connected to an output of the divisor register. The output of said converter is connected to one of the information inputs of a three remainder digits selection commutator. Another information input of the commutator is connected to an output of the dividend (or remainder) register. The output of said commutator is connected to the input of a three-digit register which is connected to one of the inputs of a microprogram control unit of said division device. The output of the control unit connected to the control inputs of all the elements of said device.

3 Claims, 3 Drawing Figures

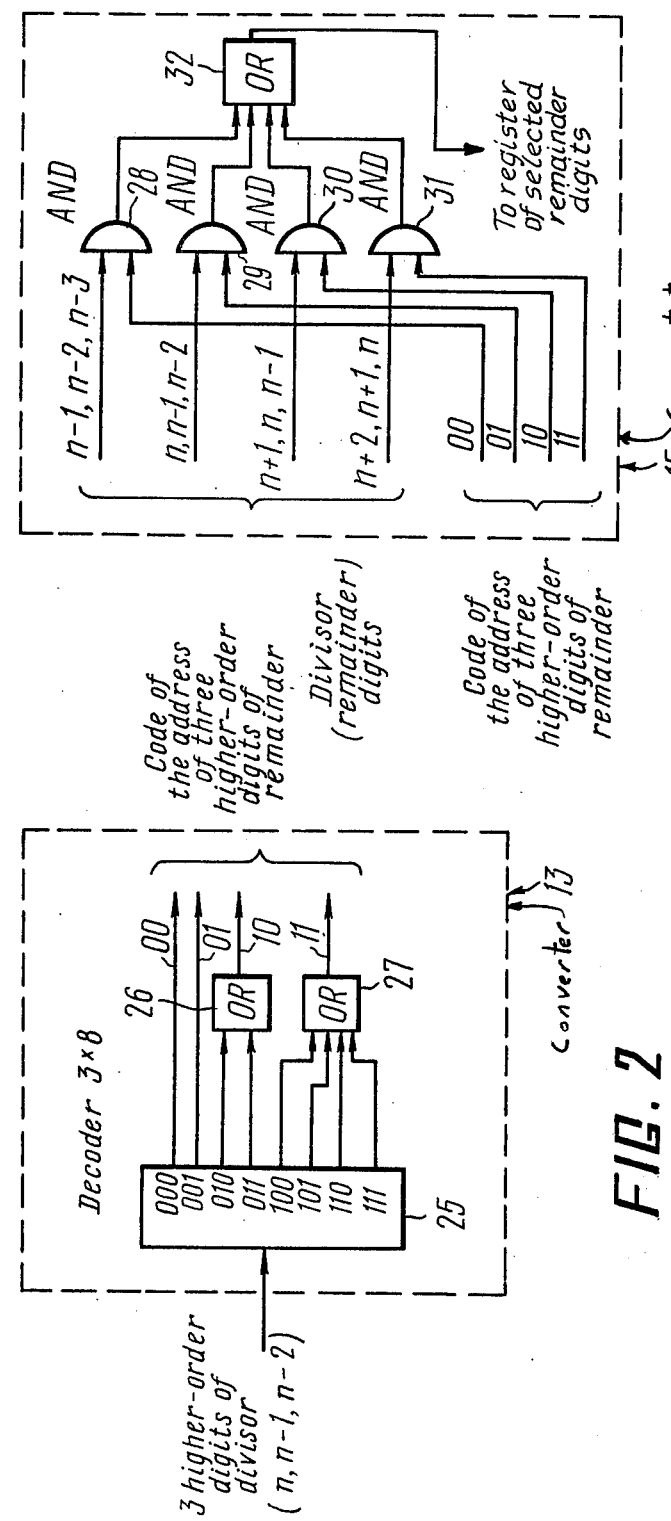

METHOD FOR DIVIDING TWO NUMBERS AND DEVICE FOR EFFECTING SAME

FIELD OF THE INVENTION

The present invention relates to computers and, more particularly, to methods for dividing two numbers and devices for effecting such methods. The invention is applicable to high-speed digital electronic computers.

DESCRIPTION OF THE PRIOR ART

There is known a method for dividing two numbers, whereby the numbers are converted to the binary code and the quotient code is determined by successively subtracting the divisor code from the dividend code and then from the successive remainder codes. The division cycle covers two time steps of the computer. During the first time step, the remainder is added to the direct or additional code of the divisor and the new remainder is shifted one digit to the left. As this takes place, the sign of the new remainder is shifted from the shift circuit of the adder and applied in the reverse code to the overflow flip-flops, being the next digit of the quotient. During the second time step, the sign of the remainder is analyzed in order to determine in which code, i.e. direct or additional, the divisor is to be applied to the input of the adder during the following division cycle.

There is known a device for dividing two numbers, which comprises an arithmetic unit whose information inputs are connected via information buses to information outputs of a dividend (or remainder) register and a divisor register. A first output of the arithmetic unit is connected to information inputs of the dividend (or remainder) register and the divisor register and a second output of the arithmetic unit is connected to the input of a microprogram control unit of the division device. The control unit is connected to a counter and control inputs of the dividend or remainder register, the divisor register, a quotient register and an input of an additional quotient register. The additional quotient register has its output connected to the information input of the quotient register.

In the device under review, the speed of dividing two numbers is determined by the division method, whereby one quotient digit is accomodated in two computer time steps. Such an operating speed is insufficient for solving a number of problems.

SUMMARY OF THE INVENTION

It is an object of the present invention to increase the speed of computerized division of two numbers.

The present invention essentially consists in providing a method for dividing two numbers, whereby the numbers are converted to the binary code and the quotient code is determined by successively subtracting the divisor code from the dividend code and then from the successive remaining codes. According to the invention, prior to subtracting the divisor code from the dividend or remainder code, a code of the address of three digits of the dividend or remainder is formed by determining the position of the highest-order significant digit in the three high-order digits of the divisor. The address thus formed serves to produce three dividend or remainder digits, i.e. a digit corresponding to the highest-order digit of the divisor and two adjacent higher-order digits. The three remainder digits are analyzed and, depending upon the result of the analysis, the code of either the single, or doubled, or trebled divisor is subtracted from the dividend or remainder code, whereby the next two digits of the quotient code are produced.

The invention further consists in providing a device for dividing two numbers, which comprises an arithmetic unit whose information inputs are connected via information buses to information outputs of a dividend (or remainder) register and a divisor register. A first output of the arithmetic unit is connected to information inputs of the dividend (or remainder) register and the divisor register, and a second output of the arithmetic unit is connected to the input of a microprogram control unit of the proposed division device. The output of the control unit is connected to a counter and to control inputs of the dividend (or remainder) register, the divisor register, a quotient register and the input of an additional quotient register. The additional quotient register is connected with its output to the information input of the quotient register. The device further includes, according to the invention, a converter of the code of the three higher-order digits of the divisor to the address code of three digits of the dividend or remainder, which is connected by an information input to the output of the divisor register by a control input to the output of the microprogram control unit of the division device, and by an output to one of the information inputs of a three remainder digits selection commutator. The converter also determines which group of three digits of the remainder should be analyzed. The commutator is connected by another information input to another output of the dividend (or remainder) register and by a control input to the output of the microprogram control unit of the division device. The output of the commutator is connected to the input of a three-digit register whose output is connected to one of the inputs of the microprogram control unit of the division device. The device still further including a doubled divisor register and a trebled divisor register for storing the doubled divisor and the trebled divisor, respectively. These registers have their control inputs connected to the output of the microprogram control unit of the division device. Their information inputs are connected to the first output of the arithmetic unit. The outputs of these registers are connected to the information buses. An additional buffer register for intermediate storage of the remainder is connected by an information input to the output of the dividend register, by another information input to the first output of the arithmetic unit, by a control input to the output of the microprogram control unit, and by an output to the information bus.

BRIEF DESCRIPTION OF THE DRAWINGS

The present invention will be better understood from the following detailed description of a preferred embodiment thereof to be read in conjunction with the accompanying drawings wherein:

FIG. 2 is a block diagram of the converter; and

FIG. 3 is a block diagram of the commutator.

DETAILED DESCRIPTION OF THE INVENTION

Figure 1:
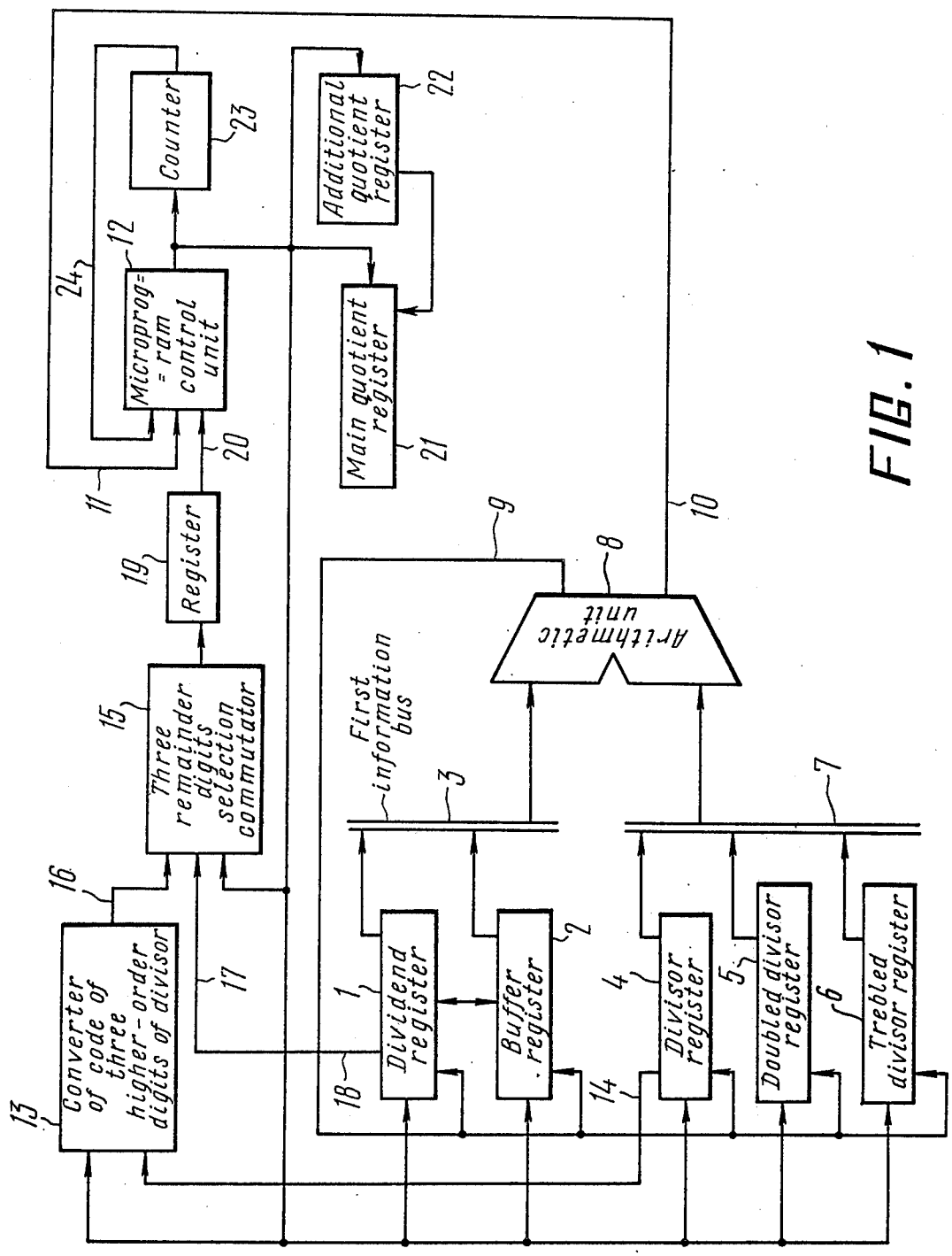
FIG. 1 is a block diagram of a device for dividing two numbers.

The proposed device for dividing two numbers comprises a dividend register 1 which serves as a remainder register during the division cycle. Initially, the dividend is stored in the dividend register 1. After the first subtraction from the dividend, the remainder is necessarily stored in the dividend register 1. Thus, after each subtraction operation, a new remainder is stored in the dividend register 1. The device also includes a buffer register 2 for intermediate storage of the remainder. The registers 1 and 2 are interconnected for transfer of information from one to the other and their outputs are connected to an information bus 3. The buffer register 2 is intended to store the remainder when it has to be restored. The device further includes a divisor register 4 a doubled divisor register 5 and a trebled divisor register 6 for storing the doubled and trebled divisor, respectively, their outputs being connected to an information bus 7. Each of the information buses 3 and 7 is connected to a respective information input of an arithmetic unit 8. An output 9 of the arithmetic unit 8 is connected to information inputs of the dividend register 1, the buffer register 2, the divisor register 4, the doubled divisor register 5, and the trebled divisor register 6. An output 10 of the arithmetic unit 8 is connected to an input 11 of a microprogram control unit 12. Said unit 12 is intended to control the proposed division device and comprises analysis circuits for analyzing the division cycle. The control unit 12 is the main timing unit and controls the signals which determine the operation of the device. Such device is well-known and is described in a book by Hasson ("Microprogram control" MIR, 1975).

For preparing the division cycle, the division device of this invention includes a converter 13 of the code of three higher-order digits of the divisor to the address code of three remainder digits, which is connected to an output 14 of the divisor register 4 so that only three higher-order digits of the divisor are applied to said converter 13. The converter 13 (FIG. 2) includes a decoder 25, to the input of which three higher-order digits of the divisor are applied. The 000 output of the decoder 25 corresponds to the 00 address code of the three digits of the remainder, the 001 output of the decoder 25 corresponds to the 01 address code of the three digits of the remainder, the 010 and 011 outputs of the decoder are connected to the inputs of the OR circuit 26, the signals at the ouput of which correspond to the 10 address code of the three digits of the remainder, and the 100, 101, 110 and 111 outputs of the decoder are connected to the inputs of the OR circuit 27, the signal at the output of which corresponds to the address code 11 of the three digits of the remainder. The device also includes a three higher-order digits selection commutator 15 whose information input 16 is connected to an output of the converter 13. An information input 17 of the commutator 15 is connected to an output 18 of the dividend register 1. An output of the commutator 15 is connected to a three-digit register 19 of the three selected remainder digits, whose output is connected to an input 20 of the microprogram control unit 12.

The three higher-order digits selection commutator 15 (FIG. 1) applies a group of three digits to the remainder (during the first cycle — the dividend) to the register 19 depending on the address code of the three higher-order digits of the remainder. If the three higher-order digits of the divisor (n, n−1, n−2) take the value 000, this corresponds to a 00 address code, and in that case digits of the remainder n−1, n−2 and n−3 will be applied to the register 19 through the AND circuit 28 and the OR circuit 32. If the three higher-order digits of the divisor take the value 001, this corresponds to a 01 address code, and the digits n, n−1 and n−2 will be applied to the register 19 through the AND circuit 29 and the OR circuit 32. If the three higher-order digits of the divisor take the value 010 or 011, this corresponds to a 10 address code and digits of the remainder n+1, n and n−1 will be applied to the register 19 through the AND circuit 30 and the OR circuit 32. If the three higher-order digits of the divisor take the values 100, 101, 110 or 111, this corresponds to the 11 address code, and the digits of the remainder n+2, n+1 and n will be applied to the register 19 through the AND circuit 31 and the OR circuit 32. Therefore, three digits of the remainder are applied to the register 19: the digit corresponding to the higher-order digit of the divisor and the two adjacent even higher-order digits.

The proposed device includes a main quotient register 21 and an additional quotient register 22 connected to the main quotient register 21 through shift circuits for effecting a two-digit shift to the left. A counter 23 serves to count the number of division cycles. An output of the counter 23 is connected to an input 24 of the microprogram control unit and an input of the counter 23 is connected to the output of the microprogram control unit 12. The output of said unit 12 is also connected to control inputs of the dividend register 1, the buffer register 2, the divisor register 4, the doubled divisor register 5, the trebled divisor register 6, the converter 13, the commutator 15, and the main and additional quotient registers 21 and 22, respectively.

The essence of the proposed method is as follows. The dividend and divisor must be normalized prior to the start of division by converting the numbers to the hexadecimal number system. To ensure a correst result, the divisor must be less than the dividend. The numbers to be divided are converted to the binary code, and the quotient code is determined by successively subtracting the divisor code from the dividend code and then from the successive remainder codes. Prior to subtracting the divisor code from the dividend (or remainder) code, there is formed the address code of three remainder digits, for which purpose the highest-order significant digit of the divisor is determined and three remainder digits are produced, i.e. a digit corresponding to the highest-order significant digit of the divisor and two adjacent higher-order digits. In the first cycle, the dividend is treated as the remainder. The remainder digits are selected as follows:

| remainder | .xxx. |
| --- | --- |
| divisor | 000.1 | where x designates the remainder digits to be selected.

The combinations of the selected remainder digits are analyzed and, depending upon the result of the analysis of the three selected remainder digits, the code of either the single, or doubled, or trebled divisor is subtracted from the remainder code, whereby the next two quotient digits are produced. The following possible combinations are analyzed.

In the case of the 000 combination of the selected remainder digits, the remainder is smaller than the divisor, so the next two quotient digits can only be 00. The remainder is shifted two digits to the left, and new three remainder digits are produced in the same way.

In the case of the 001 combination, the remainder can be greater or smaller than the divisor, so the next two quotient digits can be 01 or 00, respectively. In such a case, the divisor code is first subtracted from the remainder code and, if the subtraction is properly effected, the remainder is greater than the divisor, so the next two quotient digits are 01. In such a case the result of the subtraction is shifted two digits to the left and is the new remainder.

If the subtraction fails, the remainder is smaller than the divisor, and the next two quotient digits are 00. In this case the old remainder is restored, shifted two digits to the left, and a new division cycle is started by producing the digits of the new remainder.

In the case of the 010 combination, the next two quotient digits can be 10 or 01, so, first, the doubled divisor code is subtracted from the remainder code. If the subtraction is carried out properly, the next two quotient digits are 10. The result of the subtraction is shifted two digits to the left, and a new division cycle is started. If the subtraction is a failure, the divisor code is subtracted from the restored old remainder code; the next two quotient digits are 01; the result of the subtraction is shifted two digits to the left; and a new division cycle is started.

In the case of the 011 combination, the next two quotient digits can be 11 or 10 or 01. First, the trebled divisor code is subtracted from the remainder code. If the subtraction is effected normally, the division cycle ends by shifting the result of the subtraction to the left. If the subtraction fails, the doubled divisor code is subtracted from the restored remainder code, etc.

In the case of the 100 and 101 combinations, the next two quotient digits can be 11 or 10; in the case of the 110 and 111 combinations, the next two quotient digits can be only 11. In such cases, the operations to be carried out are similar to those described above.

The foregoing may be illustrated by the following numerical example. A number with a binary mantissa 00101101 is to be divided by a number with a binary mantissa 00111010. In this particular example it is convenient to limit to an octodigital mantissa, but the foregoing method is valid for a number, the mantissa of which can be designated by any number of digits. Thus:

| dividend | = | 00101101 |
| divisor | = | 00111010 |
| doubled divisor | = | 01110100 |
| trebled divisor | = | 10101110 |

Since the mantissa of the dividend is less than the mantissa of the divisor, the mantissa of the result will be less than unity.

The dividend is shifted two digits to the left

| dividend | = | 0010110100 |
| divisor | = | 00111010 |

Three digits of the dividend are selected for analysis, the highest of which is in the same position as the higher-order digit of the divisor. The binary value of the selected digits is 101. This means that two digits of the quotient obtained in this cycle may have the value 11 or 10.

The trebled divisor is subtracted from the shifted dividend

```
  10110100
- 10101110
```

```
  00000110
```

The subtraction is successful. The remainder is positive, which means that the digits of the quotient have a value 11.

The remainder is shifted two digits to the left

| remainder | = | 0000011000 |
| divisor | = | 00111010 |

The binary value of the selected digits of the remainder is 000. The succeeding two digits of the quotient take the value 00.

No subtraction is made.

The remainder is shifted two digits to the left

| remainder | = | 0001100000 |
| divisor | = | 00111010 |

The combination of the selected digits of the remainder is 011. The succeeding two digits of the quotient can take the value 11, 10, or 01. At first the trebled divisor is subtracted from the remainder.

```
  01100000
- 10101110
```

The subtraction is a failure. In this case the doubled divisor is subtracted from the restored remainder.

```
  01100000
- 01110100
```

The subtraction is a failure. The single divisor is subtracted from the restored remainder

```
  01100000
- 00111010
  00100110
```

The subtraction is successful. The succeeding digits of the quotient have the value 01.

The remainder is shifted two digits to the left

| remainder | = | 0010011000 |
| divisor | = | 00111010 |

A combination of the selected digits of the remainder is 100. The following two digits of the quotient can have the values 11 or 10. At first the trebled divisor is subtracted from the remainder

```
  10011000
- 10101110
```

The subtraction is a failure. The doubled divisor is subtracted

```
  10011000
- 01110100
```

```
                    -continued
                    00100100
```

The subtraction is successful. The following two digits of the quotient have the value 10.

Therefore, the eight digits of the quotient 11000110 have been obtained in four cycles of division.

The foregoing process can be continued using the foregoing method until the necessary number of digits of the quotient mantissa is obtained.

It is obvious that for equal probability of the combination of digits of the dividend and the divisor it is necessary to make on the average 19 elementary subtractions in order to obtain a quotient mantissa of 32 digits.

The proposed method will be better understood from the following description of operation of the proposed device, to be read in conjunction with the attached drawing.

The numbers used in the division operation (the dividend and divisor) are normalized using the floating point principle and converted to the hexadecimal number system (the binary code).

This is followed by entering the normalized mantissa of the dividend in the dividend register 1; the normalized mantissa of the divisor is entered in the divisor register 4; the doubled mantissa of the divisor is entered in the register 5, and the trebled mantissa of the divisor is entered in the register 6. In the counter 23 there is entered a constant determined by the number of division cycles. The number of division cycles is equal to the number of dividend or divisor digits divided by two, because two quotient digits are produced in a single division cycle.

The buffer register 2 for intermediate storage of the remainder, the additional quotient register 22 and the main quotient register 21 are reset. The three higher-order digits of the divisor's mantissa are applied from the output 14 of the divisor register 4 to the converter 13 of the code of the three higher-order digits of the divisor to the address code of three digits of the remainder. Depending upon the combination of these digits, the converter 13 produces an address code of the three higher-order digits of the remainder, which determines the position of the highest-order significant digit of the divisor. The relationship between the address code and the combination of the three higher-order digits of the divisor's mantissa is illustrated in the following Table.

Table

| DIGITS OF DIVISOR'S MANTISSA | Address Code |
| --- | --- |
| 000 | 00 |
| 001 | 01 |
| 010 | 10 |
| 011 | 10 |
| 100 | 11 |
| 101 | 11 |
| 110 | 11 |
| 111 | 11 |

From the output of the converter 13, the address code is applied to the input 16 of the three remainder digits selection commutator 15 which, depending upon the address code, selects the next three quotient digits (at the start of division, dividend digits) from the dividend register 1 whose contents is applied to the input 17 of the commutator 15. The lowest-order digit is in the same computer word position as the highest-order significant digit of the divisor's mantissa. The three remainder digits thus selected are applied to the three-digit register 19. From the register 19, the three remainder digits are applied to the input 20 of the microprogram control unit 12 which analyzes the combinations of these digits and, depending upon the result of the analysis, initiates instructions applied to the control inputs of the registers 1, 2, 4, 5 and 6. According to these instructions, information is applied from the outputs of said registers 1, 2, 4, 5 and 6 via the information buses 3 and 7 to the information inputs of the arithmetic unit 8. The arithmetic unit 8 subtracts the respective divisor code from the remainder code (in the first step from the dividend code). From the output 9 of the arithmetic unit 8, the result of the subtraction is entered in the dividend register 1 and the buffer register 2 in case the remainder has to be restored. At the same time, the microprogram control unit 12 enters the next two quotient digits to the additional quotient register 22. By an instruction from the microprogram control unit 12, the contents of the main quotient register 21 is shifted two digits to the left, vacating the last two digits, whose place is occupied by the next two quotient digits arriving from the additional quotient register 22.

Following an analysis of the contents of the register 19, the microprogram control unit 12 sends the following instructions to the control inputs of the registers 1, 2, 4, 5 and 6.

In the case of the 000 combination of the selected remainder digits, the next two quotient digits are 00. The microprogram control unit 12 produces an instruction as to the absence of reading out the remainder, the doubled and trebled divisor, respectively, from the registers 1, 2, 4, 5 and 6. In such a case, the remainder in the dividend register 1 is shifted two digits to the left, and the shifted code is the new remainder. From the output 18 of the dividend register 1, the selected digits of the new remainder are applied via the commutator 15 to the selected digit register 19. The code 00 is entered in the additional quotient register 22 and shifted two digits to the left, thus arriving at the end of the quotient register 21, where the result of division is accumulated.

In the case of the combination 001 of the selected remainder digits, the next two quotient digits can be 01 or 00. In such a case, the microprogram control unit 12 produces an instruction applied to the control inputs of the dividend register 1 and the divisor register 4, whereby the remainder code is transferred to the information bus 3 and the divisor code is transferred to the information bus 7. The contents of the information buses 3 and 7 is then transferred to the arithmetic unit 8 where the divisor code is subtracted from the remainder code. At the same time the remainder is sent from the dividend register 1 to the buffer register 2. From the output 9 of the arithmetic unit 8, the result of subtraction is applied to the dividend register 1 as the new remainder. By an instruction from the microprogram control unit 12, the constant 01 is sent to the additional quotient register 22; by a carry signal applied from the output 10 of the arithmetic unit 8 to the input 11 of the microprogram control unit 12, there is analyzed the result of subtracting the divisor code from the remainder code. If subtraction is carried out normally (if there is a carry signal), the newly produced remainder in the dividend register 1 is shifted two digits to the left; this also applies to the quotient digits at the main quotient register 21 and the additional quotient register 22. According to the address code of the three remainder digits, the new remainder digits are sent to the register 19 via the commutator 15, and a new division cycle is started. If subtraction fails (if there is no carry signal), the remainder is restored by being transferred from the buffer register 2 to the dividend register 1. The code 00 is entered in the additional quotient register 22, the remainder in the dividend register 1 is shifted two digits to the left, and the quotient in the main register 21 and the additional quotient register 22 is also shifted two digits to the left. The selected remainder digits are then transferred to the register 19 via the commutator 15, and a new division cycle is started.

In the case of the combination 010 of the selected remainder digits, the next two quotient digits can be 10 or 01. In such a case the microprogram control unit 12 sends to the control inputs of the dividend register 1 and the doubled divisor register 5 an instruction to transfer the remainder code to the information bus 3, and the doubled divisor code to the information bus 7. Then, the contents of the information buses 3 and 7 are transferred to the arithmetic unit 8, where the doubled divisor code is subtracted from the remainder code. At the same time the remainder is transferred from the dividend register 1 to the buffer register 2. From the output 9 of the arithmetic unit 8, the result of subtraction is entered in the dividend register 1 as the new remainder; the code 10 is entered in the additional quotient register 22 as the next quotient digits; the result of subtraction is analyzed and applied from the output 10 of the arithmetic unit 8 to the input 11 of the microprogram control unit 12. If subtraction is effected properly, the remainder and quotient are shifted two digits to the left in the registers 1, 21 and 22, respectively; the selected digits of the new remainder are applied to the register 19, and a new division cycle is started. If subtraction fails, the old remainder is applied from the buffer register 2 to the information bus 3; the divisor code is applied to the information bus 7 from the divisor register 4; the arithmetic unit 8 subtracts the divisor from the restored remainder code. The result of subtraction, which is the new remainder, is applied to the dividend register 1. The code 01 is entered in the additional register 22; the remainder and quotient are shifted two digits to the left; the selected digits of the new remainder are applied to the register 19, and a new division cycle is started.

In the case of the 011 combination, the next two digits of the quotient can be 11, 10, 01. In such a case the microprogram control unit 12 sends an instruction to the control inputs of the dividend register 1 and the trebled divisor register 6 to transfer the remainder code to the information bus 3 and the trebled divisor code to the information bus 7. The contents of the information buses 3 and 7 are applied to the arithmetic unit 8, where the trebled divisor code is subtracted from the remainder code.

If subtraction is proper, the code 11 is entered in the additional quotient register 22; the remainder and quotient are shifted in the registers 1, 21 and 22; the selected digits of the new remainder are applied to the register 19; and a fresh division cycle is started. If subtraction fails, the doubled divisor code is subtracted from the restored remainder, etc.

In the case of combinations of the selected remainder digits 100 or 101, the next two digits of the quotient can be 11 or 10; in the case of the combinations 110 or 111, they can be only 11.

The end of the division process is determined by the zero state of the counter 23. After each division cycle, by an instruction from the microprogram control unit 8, one is subtracted from the contents of the counter 23; the contents of said counter 23 is then applied to the input 24 of the unit 12 to check if said contents is zero.

Thus the proposed method and device for dividing two numbers make it possible to produce two quotient digits in a single division cycle. The operating speed of the proposed device is 80 percent higher than that of the device where only one quotient digit is produced during a division cycle.

What is claimed is:

1. A device for dividing two numbers, comprising:
first and second information buses;
an arithmetic unit having a first information input connected to said first information bus, a second information input connected to said second information bus, a first output, and a second output;
a dividend register having a first information input connected to said first output of said arithmetic unit, a second information input, a control input, an information output, a first output connected to said first information bus, and a second output;
a buffer register having a first information input connected to said first output of said arithmetic unit, a second information input connected to said information output of said dividend register, a control input, an information output connected to said second information input of said dividend register, and an output connected to said first information bus;
a divisor register having an information input connected to said first output of said arithmetic unit, a control input, a first output connected to said second information bus, and a second output;
a first storage register, for storing twice the divisor, having an information input connected to said first output of said arithmetic unit, a control input, and an output connected to said second information bus;
a second storage register, for storing three times the divisor, having an information input connected to said first output of said arithmetic unit, a control input, and an output connected to said second information bus;
a converter, for converting the code of the three higher-order digits of the divisor to the address code of three digits of the dividend and, in successive steps, of the remainder, having an information input connected to the second output of said divisor register, a control input, and an output;
a commutator, for selecting three digits of the remainder, having a first information input connected to said output of said converter, a second information input connected to said second output of said dividend register, a control input, and an output;
a three-digit register having an input connected to said output of said commutator and an output;
a microprogram control unit having a first information input connected to said second output of said arithmetic unit, a second information input connected to said output of said three-digit register, a third information input, and an output connected to said control input of said dividend register, said buffer register, said divisor register, said first storage register, said second storage register, said converter, and said commutator;

a main quotient register having a control input connected to said output of said microprogram control unit and an information input;

an additional quotient register having an input connected to said output of said microprogram control unit and an output connected to said information input of said main quotient register; and a counter having an input connected to said output of said microprogram control unit and an output connected to said third information input of said microprogram control unit.

2. A method of dividing comprising the steps of:

converting the dividend and the divisor to the binary code and storing them in a dividend register and a divisor register, respectively;

forming the address code of three digits of said dividend and, in successive steps, of the remainder by determining the position of the highest-order significant digit in the three higher-order digits of said divisor by means of a converter;

selecting, in accordance with the address code formed, three digits of said remainder, one digit corresponding to the highest-order significant digit of said divisor and two digits being adjacent high-order digits, by means of a commutator; and determining a quotient code by successively subtracting either the divisor, twice the divisor, or three times the divisor, depending on the three digits of the remainder selector, from the dividend and, in successive steps, from the remainder by means of an arithmetic unit.

3. A method of dividing according to claim 2, wherein the quotient code is determined by subtracting three times the divisor if a binary value of said three digits of said dividend or, in successive steps, said remainder is 111, 110, 100 or 011, by subtracting two times the divisor if said binary value is equal to 101, 100, 011 or 010, or by subtracting the divisor if said binary value is equal to 010 or 001.

* * * * *